United States Patent
Fraser

(10) Patent No.: US 6,487,200 B1
(45) Date of Patent: Nov. 26, 2002

(54) PACKET TELEPHONE SYSTEM

(75) Inventor: Alexander Gibson Fraser, Bernardsville, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/627,659

(22) Filed: Apr. 4, 1996

(51) Int. Cl.[7] .............................................. H04L 12/64
(52) U.S. Cl. ...................................... 370/389; 370/356
(58) Field of Search ................................. 370/260, 286, 370/390, 389, 468, 463, 471, 473, 465, 229, 230, 235, 433, 435, 521, 352–356

(56) References Cited

U.S. PATENT DOCUMENTS

| | | | |
|---|---|---|---|
| 5,148,429 A | * 9/1992 | Kudo et al. | 370/473 |
| 5,206,743 A | * 4/1993 | Hochman et al. | 358/440 |
| 5,229,992 A | * 7/1993 | Jurkevich et al. | 370/468 |
| 5,347,304 A | 9/1994 | Moura et al. | 348/12 |
| 5,359,598 A | * 10/1994 | Steagall et al. | 370/359 |
| 5,406,583 A | 4/1995 | Dagdeviren | 375/216 |
| 5,434,914 A | 7/1995 | Fraser | 379/219 |
| 5,444,707 A | * 8/1995 | Cerna et al. | 370/389 |
| 5,530,699 A | * 6/1996 | Kline | 370/390 |
| 5,544,164 A | * 8/1996 | Baran | 370/60.1 |
| 5,550,820 A | * 8/1996 | Baran | 370/60.1 |

FOREIGN PATENT DOCUMENTS

| | | | |
|---|---|---|---|
| EP | 0687 088 A2 | 5/1995 | ........... H04L/12/18 |
| WO | WO92/14320 A1 | 1/1992 | |

OTHER PUBLICATIONS

Bolot, J.C., "Control Mechanisms for Packet Audio in the Internet", IEEE, pp. 232–239, Mar. 1996.*
Kazushige Yamamoto et al., "A Subscriber Line Interface Processor for Asynchronous Transfer Mode Switching System", 1990 IEEE International Solid State Circuits Conference, pp. 28, 29, 256, Feb. 1990.*
Kotikalapudi Sriram et al., "Voice Packetization and Compression in Broadband ATM Networks", IEEE Journal on Selected Areas in Communications, vol. 9, No. 3, pp. 294–304, Apr. 1991.*
Ljijana Trajkovic et al., "Congestion Control for Multimedia Services", IEEE Network, pp. 20–26, Sep. 1992.*
M.K. Verma, "Personal Communications–Service Concepts and Functionality Evolution", Telecommunications, 1993, Fourth IEE Conference, pp. 241–245, 00–93.*
Hideaki Iwata et al., "An ATM Subscriber Line Interface Circuit For Voice and Telephony Over ATM (VTOA)", IEEE, pp. 270–274, May 1995.*

(List continued on next page.)

Primary Examiner—Melvin Marcelo

(57) ABSTRACT

A packet telephone system which employs a packet network that provides virtual circuits. The packet telephone system employs short packets containing compressed speech. The use of the short packets makes possible compression and decompression times and bounded delays in the virtual circuits which are together short enough to permit toll-quality telephone service. The packet telephone system employs an intelligent network interface unit to interface between the packet network and standard telephone devices. The network interface unit does the speech compression and decompression and also responds to control packets from the packet network. Consequently, many telephone system features can be implemented in the network interface unit instead of in the switches. The network interface unit may also be used to provide data connections to devices attached to it. The combination of virtual circuits, with bounded delays, short packets, rapid compression and decompression, and intelligent network interface units makes it possible to build a telephone system with fewer and cheaper switches and fewer links for a given volume of traffic than heretofore possible and also permits substantial savings in provisioning and maintaining the system.

25 Claims, 5 Drawing Sheets

OTHER PUBLICATIONS

Harry Newton, "Newton's Telecom Dictionary", Flatiron Publishing, Inc., p. 318, 00–95.*

Asynchronous Transfer Mode: Solution for Broadband ISDN, Martin DePrycker, Ellis Harwood Publishers, 2. ed., 1993.

Traffic Management Specification Version 4.0, ATM Forum/ 95–0013r9, Straw Vote, Dec. 1995.

Applied Cryptography, Wiley, 1994.

"Low–Complexity Wideband Speech Coding", J. H. Chen, Proc. IEEE Workshop on Speech Coding for Telecommunications, Annapolis, MD, Sep. 1995, pp. 27–28.

ITU–T G.114, Transmission Systems and Media. General Recommendations on the Transmission Quality for an Entire International Telephone Connection. One–Way Transmission Time, dated Mar. 1993, published 1994.

J–C. Bolot et al., "Control Mechanisms for Packet Audio in the Internet," Proceedings of IEEE Infocom 1996, Conference on Computer Communications, vol. 1, Mar. 24, 1996, pp. 232–239.

F. Halsall, Data Communications, Computer Networks and Open Systems, Addison–Wesley Publishing Company, Workingham, England, 1996, p. 499.

* cited by examiner

PACKET TELEPHONE SYSTEM

CROSS-REFERENCE TO RELATED APPLICATION

Related subject matter is disclosed in the following applications filed concurrently herewith and assigned to the same Assignee thereof: U.S. patent application Ser. No. 08/627,657, entitled "A Customer Telecommunication Interface Device With Built-In Network Features;" now U.S. Pat. No. 5,926,464 U.S. patent application Ser. No. 08/627,661, entitled "A Customer Telecommunication Interface Device Having A Unique Identifier now U.S. Pat. No. 6,178,167;" U.S. patent application Ser. No. 08/627.660, entitled "Method And Apparatus For Automated Provisioning And Billing Of Communication Services now U.S. Pat. No. 5,835,580;" and U.S. patent application Ser. No. 08/627,658, entitled "A Packet Format For Telecommunication Instruments now U.S. Pat. No. 5,943,319."

BACKGROUND OF THE INVENTION

FIELD OF THE INVENTION

The invention relates generally to systems that permit users to communicate by means of voice in real time and more particularly to such systems in which the users are connected to each other by patcket network.

DESCRIPTION OF THE PRIOR ART

At present, human beings and computers use different systems for communication. Human beings use telephone networks, while computers use packet switching networks. The telephone networks are optimized to provide switched-circuit real-time voice communication, while the packet switching networks are optimized to provide non-real time data communications.

Of course, each type of network can be used for the other purpose. When a computer is connected to a telephone network via a modem, the telephone network can be used for data communications, and computer software has become available which permits voice communication on the Internet packet switching network. The difficulty with using a telephone network for data communications or a packet switching network for voice communication is that the optimizations present in each kind of network for its main purpose cause problems when the network is used for the other purpose.

For example, data communications are generally bursty, that is, a computer will send some data and then fall silent for a while. If a telephone circuit is being used for data communication, the circuit remains dedicated to the data communications during the periods of silence, resulting in a waste of resources in the telephone system. On the other hand, in order for a voice communication between two people to be acceptable, there can only be a short round-trip delay between the time a person speaks and the time the person hears a response from the other end of the circuit. Moreover, the delay must remain relatively constant throughout the communication. The telephone system is designed for communications with these kinds of stringent real-time requirements, but packet networks are not. Delay in a packet network is a function of the overall load in the network, and consequently, the network may not be able to consistently satisfy the real-time requirements of voice communications.

Even when used simply for voice communications, the telephone network has problems which are a result of its history. The modern telephone network was designed at a time when computer systems were large, expensive, and required specialized operating environments. As a consequence of this, devices "inside" the network, such as switches and network control points, were "intelligent" (i.e., they were programmable), while devices at the edges of the network, such as telephones and answering machines, were "dumb" (i.e., not programmable).

While the intelligent devices in the network made possible a whole new array of telephone services, the intelligence was not without cost. The interactions between various kinds of services have made network behavior complex and difficult to understand and each new kind of service has meant new program code and data bases and changes to existing program code and data bases. Presently, a modern central office switch contains five million or more lines of program code. Of course, as the number of services has increased, so has the difficulty of adding new code and data bases to the system, maintaining the old code and databases, and checking the consistency of the databases and the switch's behavior. One result of this fact is that most of the cost of a modern switch is the cost of maintaining and modifying its code; another is that it has become increasingly difficult to create and modify services with the speed required by an ever-more competitive marketplace.

The fact that intelligence was available only inside the network also affected the design of the systems that provisioned the network (i.e. modified the devices and/or configuration of the network), maintained the network, and billed the customers. As a result, the provisioning, maintenance, and billing systems are now sources of large costs in the telephone system.

While the telephone equipment providers and service providers have been struggling with the demands of programming, provisioning, and maintaining the intelligent network, advances in the technology of making integrated circuits have so reduced the cost of processors and memory that every household has formerly "dumb" devices such as microwave ovens or television sets which now include a considerable amount of intelligence. At the same time, advances in transmission technology and packet switching have greatly reduced the cost of actually moving information from one location to another.

It is an object of the present invention to takes advantage of the existence of low-cost programmable devices and the advances in packet switching and transmission technology to create a telephone system which is equally adapted to voice and data communication, which requires fewer switches and trunk lines than existing systems, and for which programming, maintenance, provisioning, and billing are greatly simplified, and thereby to provide telephone and other telecommunications services at a substantially lower cost than heretofore possible.

SUMMARY OF THE INVENTION

A telephone system which attains the objects of the invention is implemented in a packet network which provides virtual circuits with constrained delay and delay variation and can thereby guarantee a bound on the maximum round-trip delay time. At the edges of the network are intelligent network interface units (NIUs), which can send packets to each other via the packet network. The network interface units are connected between the packet network and standard telephone devices such as telephones or central office switches.

Control packets are used to establish virtual circuits with bounded round-trip delays between a pair of the network interface units. Once the circuits have been established, each network interface unit of the pair receives voice signals from the standard telephone device to which it is attached, makes a compressed digital representation of the voice signals, places the compressed representation in short packets addressed to the virtual circuit which takes them to the other network interface unit of the pair, and places the packets on the network. On receiving a packet, the other network interface unit decompresses the compressed representation and provides the resulting voice signal to its attached standard telephone device. Further compression is attained by means of silence detectors in the network interface units. When the silence detector detects a period of silence, the network interface unit places an indication in the compressed representation that the silence has begun and immediately sends the packet. When the silence detector detects that the period of silence has ended, the network interface unit immediately begins making a new packet.

From the point of view of the user of the standard telephone device, system 101 behaves exactly like a standard telephone network. Each network interface unit responds to control signals from the standard telephone device by making control packets and placing them on the packet network and to certain control packets received from the network by providing control signals to the standard telephone device.

Because the telephone system is implemented using a packet network and network interface units, which can produce and respond to control packets, the telephone system can be used for data as well as voice. Further, the ability of the network interface units to produce and respond to control packets means that new services can be defined in the network interface units instead of in the network. That in turn greatly simplifies the design of devices in the network. The use of packets together with voice compression and silence detection to produce the representation of the voice signals in the packets greatly reduces the amount of network resources required for a given volume of telephone calls and thereby the cost of building and running the system. The use of short packets in a packet network with bounded maximum delays permits consistent toll-quality voice reproduction.

The fact that the network interface units are intelligent operates to reduce the cost of provisioning and maintenance. The telephone system maintains a map of the network, and periodically polls the network to determine whether any new devices have been attached to it. Each new network interface unit automatically responds with the information the telephone system needs to add it to the network. The telephone system also periodically polls existing devices to determine their status, and thus always has a nearly-current map of the network.

The telephone system also employs simplified billing. Users are charged a monthly access fee and a flat per-minute rate for telephone calls, regardless of the location called. The billing data base thus need only record how many minutes a subscriber has used the network each month, and the subscriber's telephone bill is reduced to a single line listing the access fee and the number of minutes the network was used. If the subscriber consents, the telephone system can charge the amount owed each month to the subscriber's credit card, with the bill appearing as a line on the credit card statement.

The foregoing and other objects and advantages of the invention will be apparent to one of ordinary skill in the art who peruses the following Drawing and Detailed Description, wherein:

Figure 1:
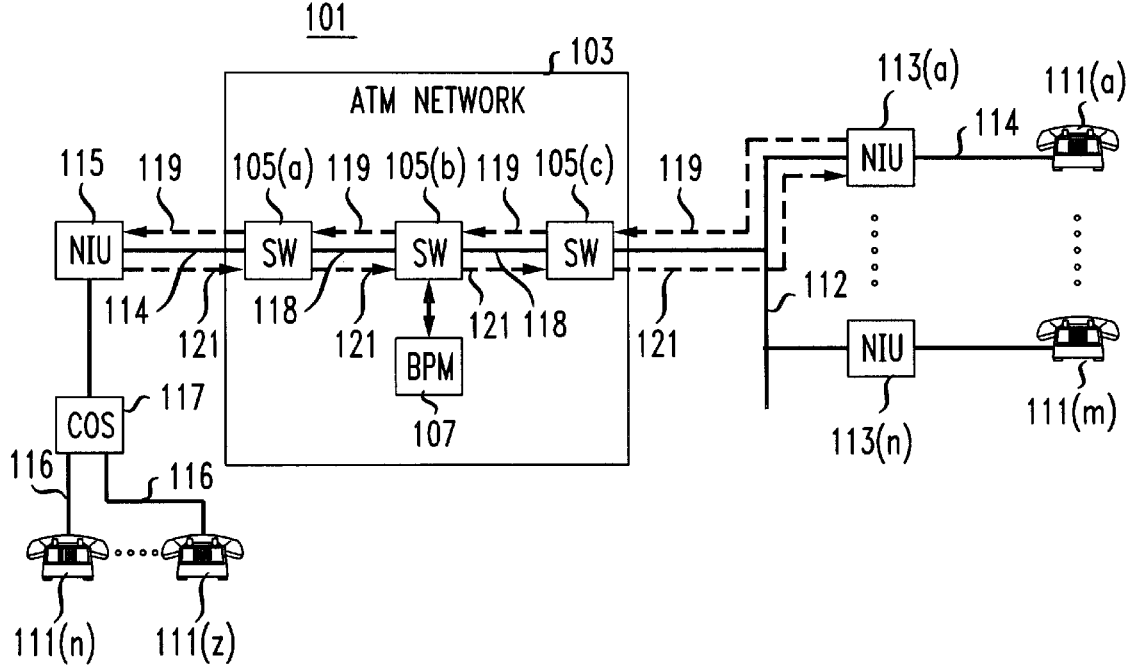
FIG. 1 is an overview of the telephone system.

The reference numbers employed in the Drawing and the Detailed Description have three or more digits. The two least significant digits are a number within a figure; the remaining digits are the figure number. Thus, the element with the reference number "305" is first shown in FIG. 3.

DETAILED DESCRIPTION

The following Detailed Description will first provide an overview of the telephone system described herein and its operation, will provide functional details of the operation of the network interface unit, will thereupon describe a preferred embodiment of the network interface unit, and will then describe the systems used in the telephone system for telephone number translation, billing, provisioning, and maintenance and the naming conventions employed in the telephone system.

Overview of the Telephone System: FIG. 1

FIG. 1 shows an embodiment 101 of the telephone system described herein. Telephone system 101 is implemented using an asynchronous transfer mode (ATM) network 103. ATM networks are described in Martin DePrycker, *Asynchronous Transfer Mode: Solution for Broadband ISDN*, Ellis Harwood Publishers, 2. ed., 1993. In such networks, the data moves over the network in 53-byte long packets. Each packet consists of a 5-byte header, which contains information used by the network to route the packet and by devices receiving the packet to interpret the packet, and a 48-byte body, which contains the packet's data. Packets are used both to carry control information for ATM network 103 and attached devices and to carry data between the attached devices. Physically, ATM network 103 is implemented using ATM switches 105 and trunk lines 119 connecting the switches. Trunk lines 119 are typically fiber optic cables and ATM switches 105 are very fast, so ATM network 103 has a very high bandwidth. One example of an ATM switch 105 which would work in ATM network 103 is the ASX-2000 switch made by Fore Systems, Inc. Trunk lines 119 may be DS1 or DS3 trunks leased from telecommunications companies.

ATM networks are virtual circuit networks. When two devices desire to communicate across the ATM network, the network establishes at least one virtual circuit between the devices. The virtual circuit follows a fixed route through the network, all packets using the virtual circuit follow the route, and as a result, the packets arrive in the same order at the destination of the communication as they left the source of the communication. The virtual circuit thus has the same logical properties as a physical circuit. The queuing disciplines used in ATM switches further permit specification of a bounded maximum round-trip delay for the virtual circuit. For details on this aspect of ATM networks, see *Traffic*

*Management Specification Version* 4.0, ATM Forum/95-0013r9, Straw Vote, December 1995, and in particular the discussion of ATM Service Architecture in section 2.

Because ATM networks provide virtual circuits with bounded maximum delay, the packets in ATM systems can be used for communication with real-time requirements, such as voice communication and video, as well as for data communications. A key difference between the ATM switches 105 used in ATM network 103 and the central office switches currently used in telephone networks is that the ATM switches do not provide services such as call waiting, voice mail, 800 number service, or call forwarding (such services are termed hereinafter "features"), but are instead optimized for establishing virtual circuits and routing packets.

Continuing with FIG. 1, ATM network 103 contains not only switches 105 and trunks 118, but also billing, provisioning, and maintenance system 107. Information maintained by this system includes information concerning the configuration of telephone system 101, provisioning information, maintenance information, and subscriber information including directory information and billing information. As will be described in more detail below, certain properties of telephone system 101 permit these data bases to be both more useful and simpler than the similar data bases used in present telephone systems.

In telephone system 101, network interface units 113 serve as the interface between standard telephone equipment such as central office switches 117 and customer premises equipment 111 and between non-telephone equipment such as computers or audio-visual devices and ATM network 103. Network interface units 113 may be connected by means of a variety of media 112 and 114 to ATM network 103, for example, fiber optic cables, coax, or wireless media. Indeed, the medium may be an ISDN telephone line or even a standard telephone line. Because telephone system 101 employs packets and virtual circuits, a single communications medium 112 or 114 may be multiplexed among many network interface units 113.

For example, in one embodiment of the telephone system 101, communications medium 112 may be a CATV network with two-way capability. In such an embodiment, switch 105(c) would be connected to the head end of the CATV network, network interface units 113 would be connected in the home to the cable outlet, and a customer premises device 111 would be connected to network interface unit 113. An advantage of multiplexing communications medium 112 among many network interface units 113 is that switch 105 need only be connected to communications medium 112, instead of directly to each network interface unit 113.

Telephone system 101 may also use network interface units to interface between telephone system 101 and standard telephone switches. In FIG. 1, for example, network interface unit 115 is connected between ATM switch 105 (*a*) and standard central office switch 117, which is in turn connected by standard subscriber loops 116 to customer premises equipment 111. Network interface units 115 which interconnect between ATM network 103 and standard telephone switches such as central office switch 117 permit telephone system 101 to be used to provide long distance service between subscribers to standard telephone systems and also permit users of telephone system 101 who are not subscribers to standard telephone systems to telephone those who are. Of course, to achieve the latter purpose, network interface unit 115 may be connected to a toll switch instead of to a central office switch.

In other variations of system 101, part or all of the functions of network interface units 113 could be performed in a switch to which the customers were connected by standard telephone lines, but which itself was connected to an ATM network. The network interface units in the switch would translate between ATM packets and voice signals in exactly the same fashion as the NIUs 113 on customer premises. The switch could have a separate network interface unit 113 for each customer or could multiplex network interface units 113 among several customers. Such an arrangement would make it possible for a telephone company which provided local service to construct a long-distance network at much lower cost than by using conventional methods. It is also possible to use network interface units 113 in a standard telephone system. In such a system, the network interface unit 113 would be connected by a standard telephone line to a standard telephone switch. In this system, the telephone line would be used as a medium to carry the ATM packets in the same fashion as it is used presently to carry data.

Network interface units 113 are intelligent devices, and are consequently used to implement features in telephone system 101. The same network interface unit can provide the interface between standard telephone equipment, computers, and audio-visual equipment. A user of telephone system 101 who has direct access to a network interface unit 113 may consequently employ telephone system 101 not only for voice communication, but also for data communication and as a source of music or television. Because all of these forms of communication are done using virtual circuits, no extra equipment is required for simultaneous use of telephone system 101 for several of the forms of communication, for example, for voice communication and data communication.

When a network interface unit 113 is interfacing between standard telephone equipment and ATM network 103, it performs two functions:

it translates control information between the form required for the standard telephone equipment and the form required for packets in ATM network 103; and it translates between a highly-compressed representation of voice signals used in voice packets in the ATM network and whatever representation of voice signals (including the signals themselves) that is required for the standard telephone equipment.

Together, the use of the highly-compressed representation in the packets and the use of virtual circuits to carry the packets means that voice telephony that has substantially the same quality as that provided by the current telephone system can now be achieved with a bandwidth of only 16 Kbs instead of the 64 Kb bandwidth used in the current telephone system. Future improvements may permit a bandwidth of 8 Kbs. That in turn means that telephone system 101 requires far fewer trunk lines 110 and switches 105 than a standard telephone system of equivalent capacity. The switches themselves are smaller and less complex and therefore cheaper to build and maintain than their equivalents in standard telephone systems. Smaller switches are possible first, because multiplexed transmission media are used to connect them to the network interface units, and second, because much of the network's intelligence has been moved from the switches to the network interface units.

In embodiments of telephone system 101 in which each subscriber has his or her own network interface unit 113, the fact that features are implemented in the network interface units 113 offers significant advantages. To begin with, the implementation of the features in network interface units 113 instead of the switches 115 effectively isolates the features from the rest of the network. As long as the packets which a given network interface unit 113 places on ATM network 103 have legal forms for that network, what happens inside a given network interface unit 113 affects only that network interface 113 and the other network interface 113 with which it is communicating across ATM network 103, but does not affect ATM network 103 or any other network interface unit.

The fact that the features are isolated not only makes network operation and maintenance easier, it also makes it possible to treat network interface unit 113 as an open platform for which anyone may develop features. As a result, the number of useful features will increase rapidly, most of the cost of feature development will be shifted from the telephone service provider or the switch manufacturer to software producers, and subscribers will receive more features faster than is possible when the features are implemented in central office switches.

A final advantage of implementing features in the network interface units 113 instead of in switches is that each network interface unit 113 implements only the features desired by its subscriber, while a switch must implement all features desired by any subscriber using the switch. Thus, in the switch, all subscribers not only pay for the services they require, but their rates also reflect the overhead resulting from the fact that all features must be implemented in the switch. With the network interface unit 113, on the other hand, the subscriber bears only his own overhead.

Because each network interface unit 113 is connected to ATM network 103 and has intelligence, the subscriber can purchase new features simply by placing a call to the feature provider and having the feature provider download the feature to network interface unit 113 for self-installation by network interface unit 113. Of course, if a network interface unit 113 is located on customer premises, features could also be installed from CD-ROMS or floppy disks, as is presently done with personal computers.

One problem with packet switching networks is security. The problem has two levels: privacy for messages being carried over the network and security for network 103 itself. The latter is a problem because control information is transported in the same fashion as messages. In telephone system 101, security is provided by means of encryption techniques such as the public key encryption techniques described in Bruce Schneier, *Applied Cryptography*, Wiley, 1994. The keys necessary for encryption and decryption are provided to network interface unit 113 and switch 105 when network interface unit 113 is added to telephone system 101.

Both private and network security are achieved by techniques involving public keys and shared keys. A given switch 105 has a public key for each of the network interface units 113 to which switch 105 is connected by communications medium 112 and each of the network interface units has a public key for that switch 105. Public key encryption is computationally expensive; consequently, when the given switch and a network interface unit begin to communicate with each other, for example, to set up a virtual circuit, they use the public keys to send the messages required to establish a shared key for the duration of the virtual circuit; the shared key is then used to encrypt packets during the life of the virtual circuit. When the circuit is taken down, the shared key is discarded.

Figure 3:
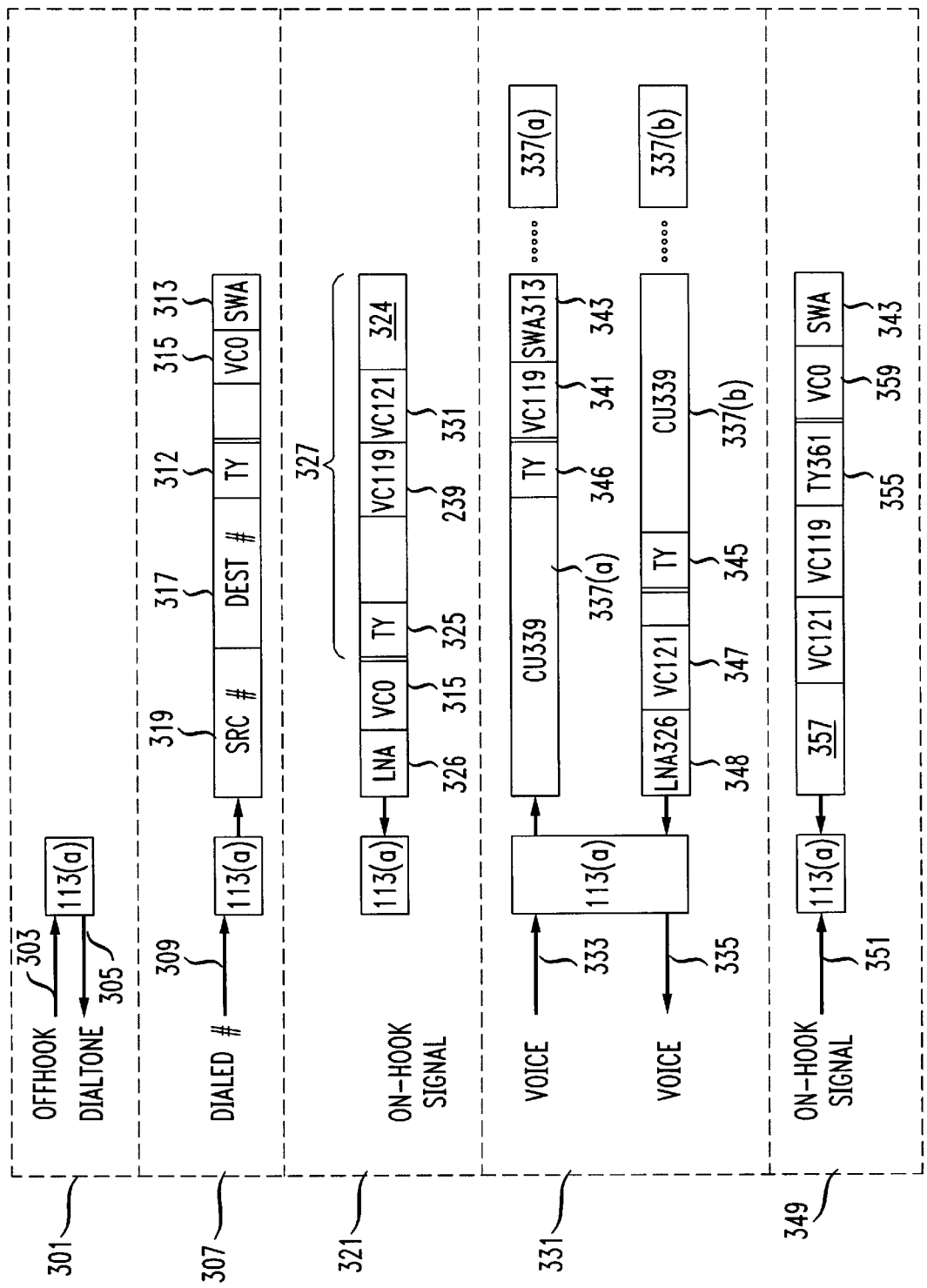
FIG. 3 shows a telephone call in the telephone system from the point of view of the network interface unit.

Overview of Operation of Telephone System 101: FIG. 3

From the point of view of a person making a telephone call over telephone system 101, the telephone system behaves exactly like a standard telephone system. For example, presume that a caller at telephone 111(*a*), which is connected directly to telephone system 101, is making a call to telephone 111(*z*), which is part of a standard telephone system and is therefore connected to central office switch 117.

FIG. 3 shows what happens in the course of the call from the point of view of network interface unit 113(*a*). In the packets in FIG. 3, the header is divided from the body by a double line. The caller begins by picking up the handset of telephone 111(*a*); Telephone 111(*a*) responds to this by providing an offhook signal 303 to network interface unit 113(*a*), which in turn provides dial tone 305 to telephone 111(*a*). The caller then dials the number of telephone 111(*z*). Network interface unit 113(*a*) responds to the dialed number by making a call set-up control packet 311 and placing it on communications medium 112. Call set-up packet 311 includes at least the following information:

In the header:
1. the local address 313 in transmission medium 112 of switch 105(*c*); and
2. the virtual circuit 315 for the packet, in this case, virtual circuit 0, which is used in system 101 as the control circuit;

In the body:
1. the type 312 of the packet, in this case call set-up;
2. source telephone number 319, which is the telephone number of telephone 111(*a*); and
3. destination telephone number 317, which is the telephone number of telephone 111(*z*).

The source and destination telephone numbers are network addresses, i.e., they uniquely identify to network 103 the devices, which are presently attached to it. Each device attached to or belonging to network 103 has such a network address; as will be explained in more detail later, the network addresses of network interface units 113 are location dependent; the network addresses of non-portable components such as switches may encode location information.

Switch 105(*c*) receives packet 311 and responds to it by sending control packets in ATM network 103 which result in simplex virtual circuits 119 and 121 (indicated by dashed lines) being set up between network interface unit 113(*a*) and network interface unit 115. Virtual circuit 119 carries packets whose source is NIU 113(*a*) to the destination NIU 115 and virtual circuit 121 does the reverse.

In order to set up the virtual circuits, switch 105(*c*) must translate the destination telephone number from packet 311 into the network address of NIU 115 to which packets destined for telephone 111(*z*) are sent. Network 103 maintains tables permitting such translations, and switches in network 103 contain routing information from which a given switch in a virtual circuit can determine at the time the virtual circuit is being set up how to route the next portion of the virtual circuit. Once the virtual circuit is established, each of the switches which is traversed by the circuit has a table which relates the virtual circuit's identifier to the outgoing link which carries the virtual circuit. As part of the set up of the virtual circuits, a timer is set going and is associated with source telephone number 319.

When the circuits are set up, switch 105(*c*) sends packet 324 to interface unit 113(*a*), as shown at 321. In packet 324, the header contains the local address 326 in medium 112 of NIU 113(*a*) and the virtual circuit of that packet, namely VC(0) 315. The body 327 contains at least Type 325 indicating that the packet specifies establishment of a virtual circuit and the identifiers for virtual circuits 119 (329) and 121 (331). After receiving packet 324, network interface unit 113 is ready to send and receive voice packets.

Once the virtual circuit has been established, switch 105(*a*) sends network interface unit 115 a packet that indicates that the circuit has been established and contains at least the virtual circuit identifiers and perhaps also the source telephone number. Network interface unit 115 responds to the packet by producing the signals required to have standard telephone switch 117 establish a connection to telephone 111(z). When the connection is established, telephone 111(a) and telephone 111(z) can begin to communicate by means of voice packets sent over virtual circuits 119 and 121.

To make the voice packets, network interface units 113(a) and 115 translate the voice signals they receive from the telephone equipment into the compressed representations used in the voice packets. When the network interface units receive voice packets, they translate the compressed representations voice packets into voice signals for the telephone equipment. This stage, which begins with the transmission of the ringing or busy signal from switch 117, is shown for network interface unit 113(a) at 331. Voice signals 333 from telephone 111(a) are input to network interface unit 113(a), which produces voice packets 337(a) and outputs them to medium 112.

The header for each voice packet 337(a) contains local address 343 for switch 105(c) in medium 112 and the virtual circuit identifier 341 for virtual circuit 119. The body contains the packet type 345 and a compressed representation of the voice signals 339. When switch 105(c) receives the packet, it routes the packet via virtual circuit 119 to switch 105(a), which changes field 343 to specify the local address of network interface unit 115. Network interface unit 115 responds to each packet 337(a) by producing the voice signals specified in the compressed representation 339 and providing them to switch 117, which transmits them to telephone 111(z). Network interface unit 115 handles voice signals from telephone 111(z) in the same fashion as described for network interface unit 113(a) and sends voice packets 337(b) with the compressed representation via virtual circuit 121 to switch 105(c), which adds local address 326 for NIU 113(a) and places the packet on medium 112. When network interface unit 113(a) receives the packet, it translates the compressed representation 339 into voice signals 335.

The exchange of voice packets described above lasts until one or the other of the telephones hangs up. What happens if telephone 111(a) hangs up is shown at 349 of FIG. 3. Network interface unit 113(a) receives on hook signal 351 from telephone 111(a) and responds to the on hook signal by sending control packet 355 to switch 105(c). Control packet 355 is a virtual circuit take-down packet. The body contains at least the take down type 361 and the virtual circuit identifiers of virtual circuits 119 and 121. The header contains the address of switch 105(c) (SWA 343) and specifies control virtual circuit 0 (359). Switch 105(c) responds to packet 355 by generating the messages to the other switches which are required to take down the two virtual circuits. In response to one of these messages, the timer is read and the length of time the call took along with the phone number to which it is to be billed are sent to a billing data base in billing, provisioning, and maintenance system 107. The information is of course sent across the network in ATM packets. When switch 105(a) receives its take down message, it produces a call termination packet which it sends to network interface unit 115. Network interface unit 115 responds by sending signals to switch 117 which produce a dial tone at telephone 111(z).

Control packets are used to implement features in network interface unit 113 instead of in switch 125. For example, when a telephone 111(k) has a call forwarding feature activated, the feature is activated in the telephone 111(k)'s network interface unit 113(k). When a call set up packet 324 for a telephone call whose destination is telephone 111(k) arrives in network interface unit 113(k), network interface unit 113(k) responds with a control packet to switch 105(c) which indicates that the call is to be forwarded and contains the telephone number for forwarding. Switch 105(c) then routes the virtual circuit to that telephone instead of telephone 111(k).

Call waiting works similarly. Because telephone system 101 employs virtual circuits instead of real ones, a given network interface unit 113(k) can easily deal with a second call that arrives while a first one is in progress. From the point of view of network interface unit 113(k), all that the fact that a call is in progress means is that network interface unit 113(k) is exchanging packets over the call's virtual circuits with another network interface unit 113(i). While this is going on, network interface unit 113(k) is free to respond to other packets which specify network interface unit 113(k) as a destination. If one of these is a call set-up packet 324, network interface unit 113(k) responds to the packet by simply generating the same kind of beep to telephone 111(k) as is presently done by call waiting.

Services like 800 number service can be implemented in specialized network interface units as well. For such a service, the network interface unit (perhaps owned by the person paying for the 800 service) does the routing of calls made to the 800 number to the telephone numbers of the people who handle the calls. As far as telephone system 101 is concerned, the only difference between an 800 number and an ordinary telephone number is that the call is billed to the destination telephone number instead of to the source telephone number.

Details of a Preferred Embodiment

The following discussion of the details of a preferred embodiment will first discuss voice encoding in the preferred embodiment and will then disclose details of the network interface unit.

Figure 2:
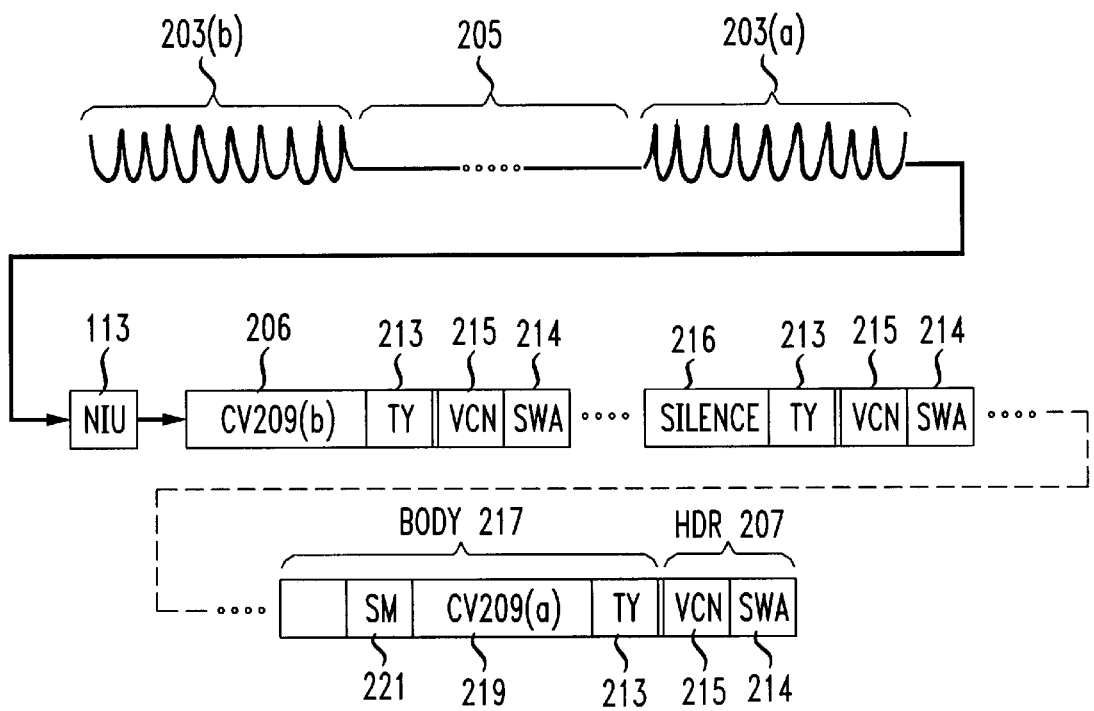
FIG. 2 is an overview of the voice compression performed by the network interface unit.

Voice Encoding: FIG. 2

In a preferred embodiment, the voice signals in voice packet 205 are encoded using an encoding scheme such as Transform Predictive Coding, explained in J.-H Chen, "Low complexity wideband speech coding", in: *Proc. IEEE Workshop on Speech Coding for Telecommunications*, pp. 27–28, Annapolis, Md., September 1995. Encoding and decoding are both done on microprocessors in the network interface units. At present, encoders and decoders which will run on microprocessors such as the Pentium microprocessors manufactured by Intel (Pentium is a trademark of Intel) are able to reduce the bandwidth required for toll-quality voice from 64 Kbs to 16 Kbs, and future reductions to 8 Kbs appear to be possible.

Further bandwidth reductions are obtained by using the microprocessor in the network interface unit to detect silence. When silence is detected, the microprocessor indicates that fact to the encoder, which inserts a silence marker in the speech packet it is currently working on and ceases encoding. The microprocessor then immediately sends the packet. When the microprocessor detects that the silence has ended, it signals the encoder to begin encoding again, and sends the next speech packet as soon as the encoder has finished. In some embodiments, the microprocessor may also periodically send "silence" packets during the period of silence, so that telephone system 101 knows that the virtual circuit is still alive.

At the destination network interface unit, the decoder may respond to the silence marker by beginning to generate low-level background noise to indicate to the user that the circuit is not dead. In some embodiments, the silence marker or the silence packets may even specify the generation of particular kinds of background noise to reflect the background noise being received from the attached telephone device in the source network interface unit.

All of this results in the stream of voice packets shown in FIG. 2. The speech signal input from the telephone connected to NIU 113 is shown at 201, a first period of speech, shown as signals 203(*a*), is followed by a period of silence 205, and that is followed by a second period of speech, shown as signals 203(*b*). Input 201 is received in NIU 113, which makes a sequence of speech packets 221. The first speech packet in the sequence is packet 219. Like the other packets, it has a header 207 and a body 217. The header for all of the packets in the sequence is the same: it contains at least the switch address 214 for the switch that NIU 113 is connected to via transmission medium 112 and the virtual circuit number 215 for the virtual circuit which is carrying the speech packets. The body for the packet includes a type field 213 which indicates that the packet contains encoded speech and may also specify information about the encoding, compressed voice data 209(*a*) encoded from first period of speech 203(*a*), and silence marker 221, which indicates that a period of silence has commenced. Following the silence marker, there may be further data which indicates what kind of background noise is to be generated.

In embodiments that periodically provide silence packets, network interface unit 113 will periodically emit a silence packet 216. The body of this packet needs only contain a type that indicates that it is a silence packet, though I may also contain data indicating the kind of background noise. When period of silence 205 ends, NIU 113 will again emit speech packets. The first of these is shown at 206. It has the same header and type as packet 219 and contains compressed voice data 209(*b*) encoded from second period of speech 203(*b*). Of course, if period of speech 203(*b*) is too short to fill an entire packet, packet 206 may also contain a silence marker.

Delay in a Preferred Embodiment

The stringent delay requirements of the telephone system are a consequence of the fact that the system was designed for conversations between human beings. In such conversations, one party may interrupt another, and when that occurs, the interrupting party expects an "immediate" response from the interrupted party. If the response is too slow in coming, the interrupting party presumes that the interrupted party is slow-witted or perhaps even intoxicated.

When the parties are conversing over a telephone network, the delay which the interrupting party perceives in receiving a response is made up not only of the length of time it takes the interrupted party to respond once he or she hears the interruption, but also of the round-trip delay of the circuit in the telephone network over which the parties are conversing. The round-trip delay of the circuit is the time it takes for a voice signal to go to one end of the circuit and return. A short round-trip delay is unobjectionable; as the delay increases, each party perceives the other as slow-witted; after a certain point, the delay makes interactive conversation impossible and the parties must use a "push to talk" button in the style of a walkie-talkie radio.

Much empirical work has been done on determining what delays are tolerable in a telephone system. The results of this work may be found in the ITU standards document ITU-T G.114, *Transmission Systems and Media. General Recommendations on the Transmission Quality for an Entire International Telephone Connection. One-Way Transmission Time*, dated March, 1993, published 1994. As set forth there, one-way delays (i.e., half the round-trip delay) of 25–150 msecs are acceptable if echo cancellation is employed; above 150 msecs, high-performance echo cancellation must be employed and the delay may not be acceptable if one party interrupts another; one-way delays of more than 400 msecs. are to be avoided if at all possible.

Delay is more troublesome in a packet-based telephone system than in a standard telephone system. There are three reasons for this:

queuing delays in the packet switches;

the time needed to encode and decode the compressed voice representation; and the time needed to assemble packets.

The preferred embodiment solves these problems by using short packets to carry voice data, using queuing techniques in the packet switches which bound the delay involved in transmitting packets in virtual circuits across the network, using fast encoding and decoding techniques to translate between voice signals and voice data, and doing echo cancellation in the NIUs. By combining these techniques, the preferred embodiment achieves a round-trip delay budget with echo cancellation, which is well within the bounds set forth in JTU-T G.114. The delay budget of the preferred embodiment is 300 msec for international calls and 120 msec for domestic calls. Of the 120 msec, 60 msec is allocated for the round-trip delay across ATM network 103, 45 msec is allocated for translating from voice signals to packets and vice-versa, and 15 msec is allocated for transfers between ATM network 103 and the relevant NIUs.

Figure 4:
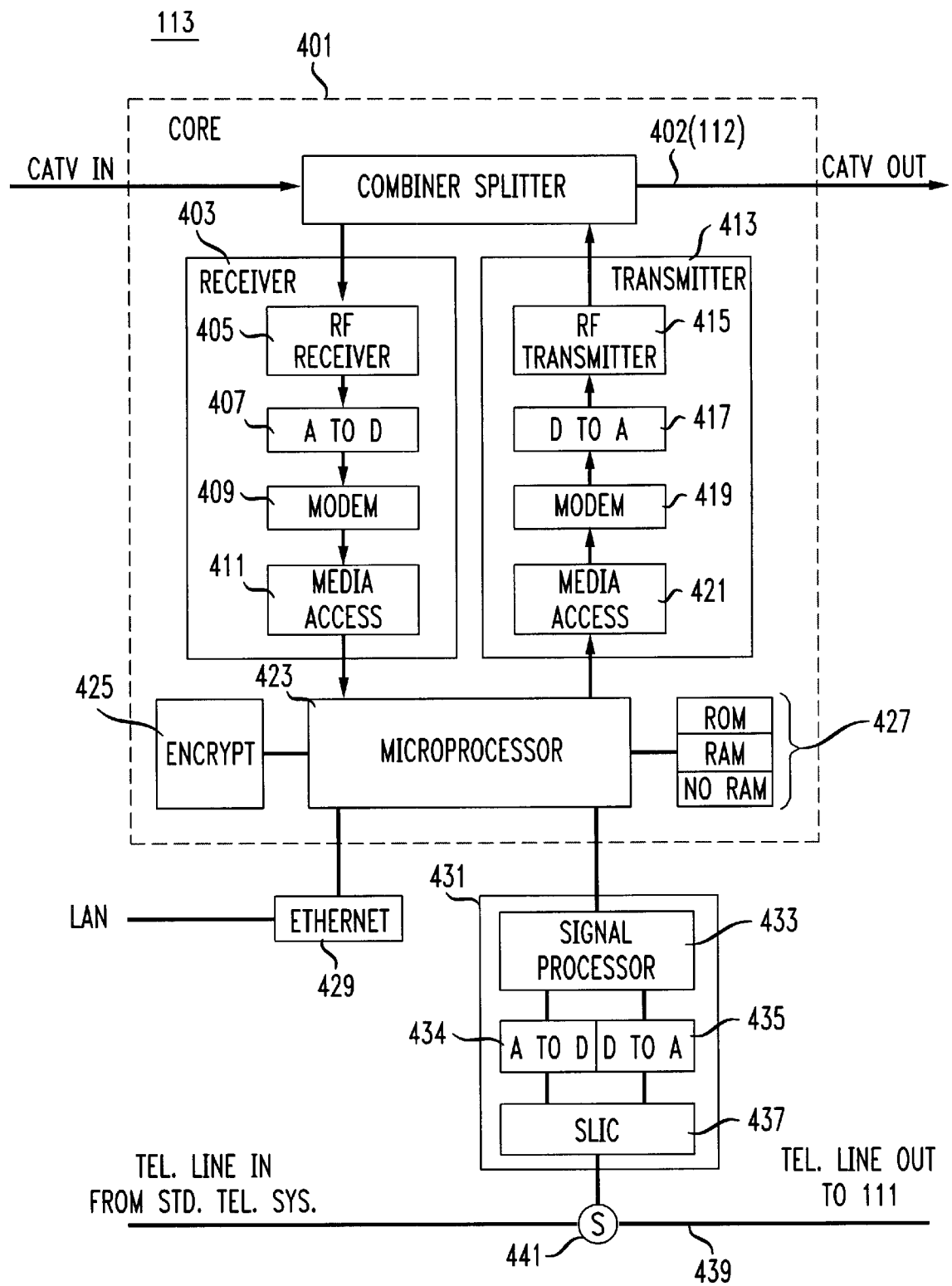
FIG. 4 shows a preferred embodiment of the network interface unit.

Details of Network Interface Unit 113: FIG. 4

FIG. 4 shows network interface unit 113 as it would be implemented in a system 101 in which communications medium 112 is a coaxial cable (CATV) 402 belonging to a cable TV system in which the portion of the bandwidth reserved for communication in the upstream direction has been activated. A product that incorporates the hardware shown in FIG. 4 has been sold by Hybrid Systems, Inc. The product is described in Moura et al., U.S. Pat. No. 5,347,304, *Remote Link Adapter for Use in TV Broadcast Data Transmission System*, issued Sep. 13, 1994.

Network interface unit 113 has three main components: a core 401, which contains microprocessor 423 and does most of the control processing and voice signal processing, an Ethernet interface 429, and a standard telephone interface 431. Ethernet interface 429 permits network interface unit 113 to be connected to a LAN employing a protocol such as Ethernet (A registered trademark of Xerox Corporation) and thus to communicate with other devices in the home. The LAN effectively operates as a home network and may have any device connected to it which can produce or consume packets on the Ethernet. Examples are of course the personal computer, but also digital television sets, digital audio devices, and home security devices. Of course, other kinds of digital home networks could be used in place of the Ethernet. Standard telephone interface 431 does the conversions between the digital signals produced by core 401 and the analog signals employed in standard telephone 111.

Continuing with core 401, core 401 contains microprocessor 423, which may be any microprocessor capable of doing the processing performed by network interface unit 113. When the hardware shown in FIG. 4 is employed as a network interface unit 113 in telephone system 101, microprocessor 423 executes programs stored in memory 427 to perform at least the following functions:

providing and responding to packets on Ethernet interface 429;

providing and responding to ATM packets on CATV 402;

responding to maintenance and provisioning inquiries from ATM network 103;

voice compression and decompression;

silence detection;

echo cancellation;

POTS signaling; and downloading and executing features purchased by the user of network interface unit 113.

Algorithms for programming a microprocessor 423 to perform all of these functions are well-known in the art. In particular, the kind of echo cancellation required for network interface units 113 and 115 is explained in U.S. Pat. No. 5,406,583, N. R. Dagdiveren, *Modem with Received Signals and Transmitted Signals Comprising Signal Sets*, issued Apr. 11, 1995.

Encryption circuit 425 encrypts packets being sent over coaxial cable 402 and decrypts packets received from coaxial cable 402, and may also be used to encrypt and decrypt packets being sent over or received from LAN 429. In other embodiments, the encryption and decryption functions provided by circuit 425 may be performed by microprocessor 423.

The interface between microprocessor 423 and coaxial cable 402 is provided by a radio-frequency modem. As shown in FIG. 4, the modem has a receive component (RCV) 403 and a transmit (XMT) component 413. Receive component 403 includes radio frequency receiver 405, which receives radio frequency signals 405 which represent the stream of ATM packets moving on communications medium 112 and converts them to an analog signal representing the stream of ATM packets. Analog to digital converter 407 converts the analog signal to a digital signal and modem 409 converts the digital signal to a stream of bits. Media access 411 reads the stream of bits, interprets it as ATM packets, and when it finds an ATM packet addressed to network interface unit 113, it provides the contents of the ATM packet to microprocessor 423.

Transmit component 413 does the reverse. It receives the contents of an ATM packet from microprocessor 423, makes it into the ATM packet in media access 421, and provides the ATM packet to modem 419. Modem 419 in turn provides a digital signal representing the packet to digital to analog converter 417, which converts it to an analog signal that it provides to RF transmitter 415. RF transmitter 415, finally, converts the analog signal to a radio frequency signal which it places on coaxial cable 402.

As previously pointed out, communications medium 112 is shared by many interface units 113 and switch 105 to which medium 112 is connected. There is thus a possibility of contention for medium 112 among the devices connected to it. There are many ways of dealing with this problem; if the propagation delay in medium 112 is short, the well-known technique of collision detection may be employed: a device transmits and listens to what is on medium 112 at the moment of transmission. If it is different from what was transmitted, another device is trying to transmit and both devices wait random intervals and try again.

For media 112 with longer propagation delays, reservation-based medium access protocols may be used. In these protocols, there are two independent channels: an upstream channel, which here carries packets from the NIUs 113 to switch 105(*c*), and a downstream channel, which carries packets from the switch 105(*c*) to the NIUs 113. The packets are carried in slots inframes. Included in the downstream frames are upstream reservation slots which specify slots available for reservation in upstream frames. Devices having access to medium 112 may contend for an upstream reservation slot and if the device succeeds, it may then use the slots specified by the reservation slot in the upstream frame. In interface unit 113, media access 411 and media access 421 cooperate to detect and deal with contention.

The interface between core 401 and telephone 111 is provided by standard telephone interface 431. When microprocessor 423 has processed control packets, which concern telephone 111 or voice packets for a call being made with telephone 111, it produces digital output which it provides to standard telephone interface 431. The output goes to signal processor 433, which converts the digital output into digital signals, which have the proper form for conversion into analog signals by digital to analog converter 435. Converter 435 then provides the signals to subscriber line interface circuit (SLIC) 437, which supports ringing, on-hook/off-hook detection, and two-wire communication to telephone 111 via a hybrid circuit. Telephone line 439 connects network interface unit 113 to telephone 111. Input from telephone 111 follows the reverse path: through SLIC 437 to analog to digital converter, then to signal processor 433, and finally to microprocessor 423.

In a preferred embodiment, switch 441 may be used to connect telephone 111 to either network interface unit 113 or to a standard telephone network, so that the user of telephone 111 could place calls either via telephone system 101 or a standard telephone system. In case of power failure, switch 441 can be designed to automatically connect telephone 111 to the standard telephone system.

Figure 5:
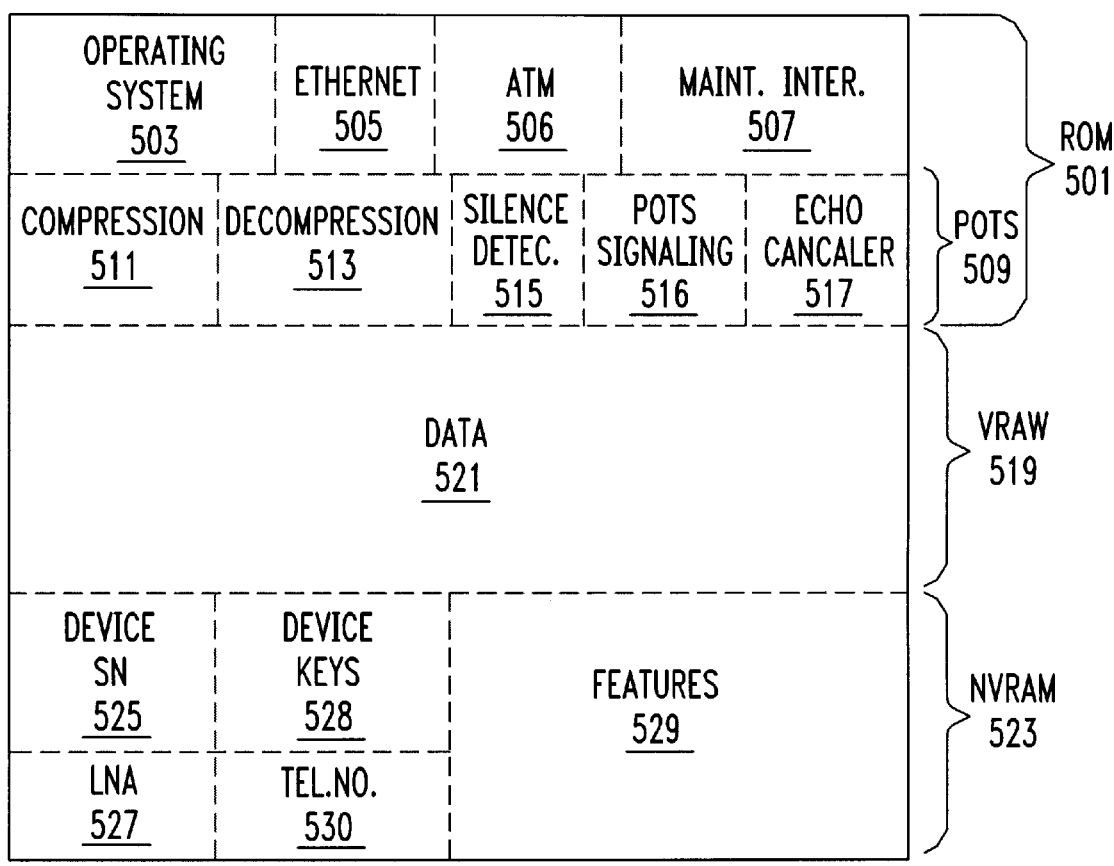
FIG. 5 is an overview of the contents of memory in a preferred embodiment of the network interface unit.

Details of Memory 427: FIG. 5

The programs and data for microprocessor 423 are contained in memory 427. Memory 427 is shown in detail in FIG. 5. It has three hardware components: read only memory (ROM) 501, which cannot be written to and retains its contents on power failure, volatile random access memory (RAM) 519, which may be read and written to, but loses its contents on power failure, and non-volatile random access memory (RAM) 523, which may be read and written to but does not lose its contents on power failure. The contents of read only memory 501 are placed in the memory when the memory is made. In the preferred embodiment, read only memory 501 contains code for operating system 503 for microprocessor 423, code 505 for the Ethernet driver used to communicate with Ethernet 429, code 506 for the ATM driver used to communicate with switch 105, and code 507 used for provisioning and maintenance interactions with network 103. If encryption and decryption are done by microprocessor 423, ROM 501 will also contain the encryption and decryption code. Read only memory 501 additionally contains the code 509 used to implement POTS in network interface unit 113, including voice signal compression code 511, voice signal decompression code 513, silence detection code 515, POTS signaling code 516, which drives standard telephone interface 431, and echo cancellation code 517.

Volatile RAM 519 contains volatile data 521 used during execution of programs by microprocessor 423. For example, the contents of ATM packets produced and received by network interface unit 113 are stored in volatile RAM 519 during processing by microprocessor 423. Non-volatile RAM 523 may be any kind of non-volatile writable memory, including EPROMS (electronically-programmable read-only memory). Non-volatile RAM 523 is used for data and programs which are installed in network interface unit 113 after it has been built but which cannot be lost due to power failure.

One portion of non-volatile RAM 523 is used for values, which identify network interface unit 113 to telephone system 101. The values include the following:

- device serial number 525, which is set when interface unit 113 is built and which indicates to telephone system 101 what kind of device interface unit 113 is;
- local network address (LNA) 527, which is set when interface unit 113 is installed in network 101, and which identifies network interface unit 113 to switch 105(*c*) to which it is connected by medium 112. Network interface unit 113 responds only to ATM packets which are addressed specifically to its LNA 527 or to a group of devices in system 101 to which network interface unit 113 belongs;
- device keys 528, which include the private key for network interface unit 113 and the public key for switch 105(*c*). The former is set when network interface unit 113 is built and the latter is set when network interface unit 113 is installed in network 101; and
- telephone number 530, which identifies network interface unit 113 to network 101.

It should be mentioned here that every device in network 101 which can send or receive ATM packets has a device serial number and a network identifier by which the device is known to network 101. In the preferred embodiment, the network identifier for consumer premises network interface units 113 is the telephone number for the network interface unit 113. Every such device also has its equivalent of maintenance and provisioning code 507. Among the functions of maintenance and provisioning code 507 is responding to control packets from system 101 which request information about the device containing the code. In response to such a control packet, maintenance and provisioning code 507 sends a message to network 101 which contains at least the device serial number, the telephone number, and status information. Maintenance and provisioning code 507 may further respond to other control packets from system 101 by performing diagnostic tests and returning a message with the results to system 101. If the results of the tests show a condition, which can be corrected by cooperation between system 101 and the device, further control packets from system 101 will cause the device to take the required corrective actions. As a consequence of the above arrangement, system 101 can determine what devices are currently connected to system 101, where they are located, and what their current status is and can further do diagnostic testing and even take corrective action.

Remaining space in non-volatile RAM 523 may be used for code and non-volatile data for features 529. To obtain code for a feature 529, the subscriber places a call to a telephone number in system 101. After payment arrangements have been made, the code for the feature is downloaded from storage connected to ATM Network 103 to NIU 113, which ordered it. A control packet accompanies the downloaded code, and microprocessor 423 responds to the control packet by executing code in operating system 503, which loads the code into features 529. When microprocessor 423 receives a packet of a type that involves the feature, microprocessor 423 will execute a portion of the downloaded code. Of course, code for a feature can also be downloaded via Ethernet 429 from a computer connected to Ethernet 429. Such code could be provided, for example, where the feature requires close cooperation between the computer and network interface unit 113.

Network interface unit 115, which interfaces ATM network 103 to a central office switch 117 or other standard telephone system switch, works on the same principles as network interface unit 113, except that the contents of the control packets and the voice packets are translated as required for the switch to which network interface unit 115 is attached.

Figure 6:
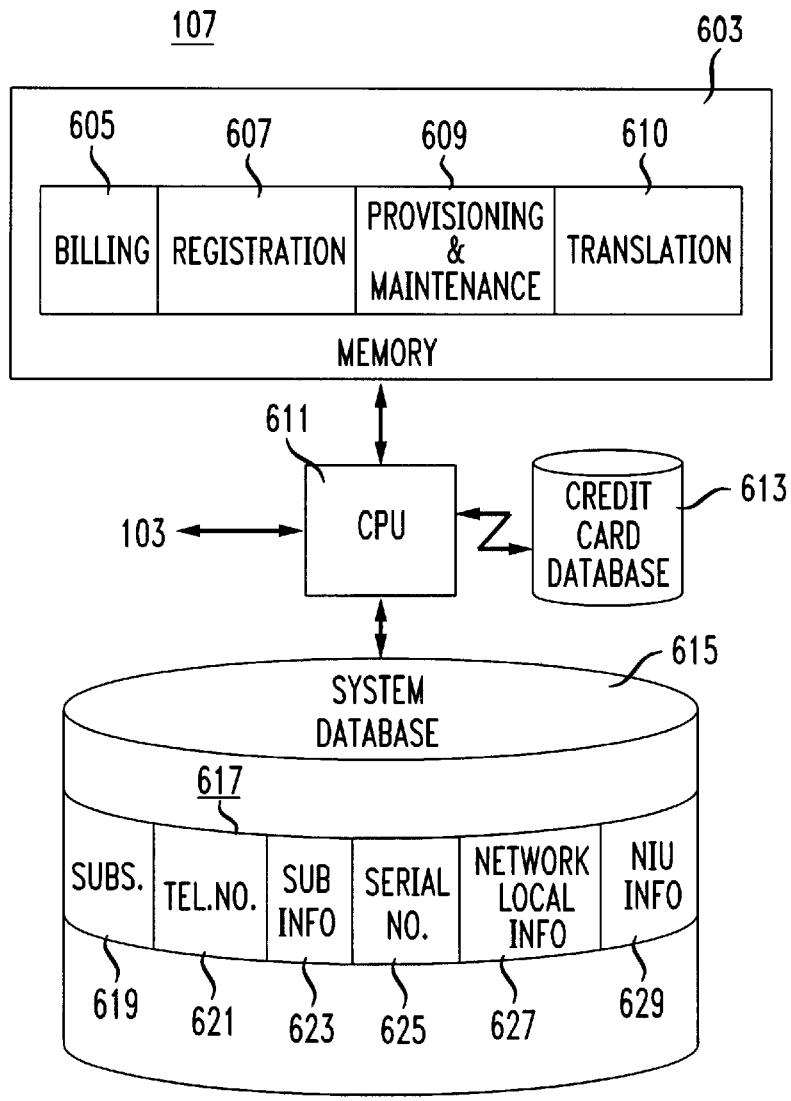
FIG. 6 is an overview of the maintenance, billing, and provisioning system of telephone system 101.

Details of Provisioning, Maintenance, and Billing in System 101: FIG. 6

Provisioning and maintenance of telephone system 101 is greatly simplified by the fact that not only the network interface units, but every device in network 101 which can send or receive ATM packets has a device serial number 525 and a network identifier such as telephone number 530 and the fact that every device also has local intelligence and its equivalent of maintenance and provisioning code 507. Among the functions of maintenance and provisioning code 507 is responding to control packets from system 101 which request information about the device containing the code. In response to such a packet, maintenance and provisioning code 507 sends a message to network 101, which contains at least the device serial number, the device's telephone number, and status information.

Maintenance and provisioning code 507 may further respond to other control packets from system 101 by performing diagnostic tests and returning a message with the results to system 101. If the results of the tests show a condition, which can be corrected by cooperation between system 101 and the device, further control packets from system 101 will cause the device to take the required corrective actions. As a consequence of the above arrangement, system 101 can determine what devices are currently connected to system 101, where they are located, and what their current status is and can further do diagnostic testing and even take corrective action.

FIG. 6 provides a logical overview of how billing, provisioning, and maintenance is done in system 101. The logical overview shows a single processor and data base; however, there may be several processors and data bases, including data bases specialized for translating from telephone numbers to locations in the network. For example, the entry for the telephone number for network interface unit 113(*a*) would indicate that it was currently connected to switch 105(*c*). Moreover, individual switches 105 may have address translation caches. One way in which such caches may be employed is disclosed in Alexander G. Fraser, *Name Translation in Communication Networks*, U.S. Pat. No. 5,434,914, issued Jul. 18, 1995.

The main components of billing, provisioning, and maintenance system 107 are a processor (CPU) 611 with a memory 603 and a system data base 615. Processor 611 is connected to ATM network 103 and can respond to control packets and messages from other components of network 103. Processor 611 may also exchange billing information with a credit card data base 613 which is maintained by a credit card company. Memory 603 contains data and the code necessary for CPU 611 to carry out its functions in network 103. The code and the functions are at least the following:

- billing code 605, which determines how much a subscriber is to be billed;
- registration code 607, which registers a new subscriber and NIU 113 in telephone system 101;
- provisioning and maintenance code 609, which keeps track of NIUs 113 and other components of network 103; and
- translation code 610, which translates telephone numbers into the network identifiers for the switches to which they are currently connected.

It should be noted here that CPU 611 can be located anywhere in network 103 and that billing, maintenance, and provisioning system 107 may be implemented using standard commercially available computers and data base systems.

System data base 615 relates subscribers to telephone numbers and to network interface units 113 and relates telephone numbers to network identifiers for switches. System data base 615 can thus be seen logically as a table in which there is an entry 617 for each subscriber to service by telephone system 101. Entry 617 contains at least the following fields:

- subscriber 619: the name and address of the subscriber;
- telephone number 621: the subscriber's telephone number;
- subscriber information 623: billing information for the subscriber;
- serial number 625: the serial number of the subscriber's NIU 113;
- network location information 627: information identifying the current location in the network of NIU 113; and
- network interface unit information 629: information about NIW 113 including the current status of NIU 113.

An important advantage of telephone system 101 is that obtaining and maintaining the information in system data base 615 is highly automated.

In a preferred embodiment, provisioning of system data base 615 for a subscriber begins when the subscriber obtains his network interface unit 113. The provider of network interface unit 113 is of course connected via telephone system 101 to system 107. When the subscriber obtains his network interface unit 113, the subscriber provides his name and address and a credit card number to the provider. The provider gives that information as well as the serial number of the network interface unit 113 being provided and the network interface unit 113's public key to system 107, which executes registration code 607 to assign the subscriber a telephone number and create an entry 617 for the subscriber in which fields 619, 621, parts of field 623, field 625, and parts of field 629 are set from the information received from the provider. Network location field 627 contains a null value. The telephone number is given to the subscriber.

The subscriber then takes his network interface unit 113 home and connects it to his cable TV cable and to his telephone line. In the preferred embodiment, system 107 periodically broadcasts a control packet, which indicates that it is ready to register new network interface addresses. When switch 105 receives the control packet, it responds by sending a control packet in transmission medium 112, which contains the switch's address in transmission medium 112, its public key, and a null local network address. Each network interface unit 113 on transmission medium 112 that does not yet have a local network address responds to this control packet by writing the public key to device keys 528 and sending a control packet to the switch. The control packet has been encrypted with the switch's public key and contains at least the network interface unit's serial number. Switch 105 responds to this control packet by sending a control packet with the serial number and the switch's network identifier across ATM network 103 to system 107.

System 107 responds to its control packet from switch 105 by using serial number 625 to locate entry 617 for the subscriber who obtained the NIU 113. System 107 then writes the switch's network identifier to network location information field 627. That done, it obtains NIU 113's public key from NIU information 629 and the telephone number from telephone number 621 and sends another control packet to switch 105 with NIU 113's serial number, telephone number, and public key. Switch 105 enters this information in its tables and sends an encrypted control packet to network interface unit 113. This packet still uses the null address, but because it has been encrypted using NIU 113's public key, it can be read only by the network interface unit 113. The packet confirms to network interface unit 113 that it has been incorporated into telephone system 101. The packet contains at least network interface unit 113's local network address in medium 112 and its telephone number. Network interface unit 113 responds to this packet by writing the telephone number to telephone number field 530. NIU 113 is now ready to operate and indicates its readiness to the subscriber, who can begin using telephone system 101 to make and receive telephone calls. The calls may be made to and received from other subscribers of telephone system 101 and subscribers of telephone systems to which telephone system 101 is connected.

The foregoing protocol for adding network interface unit 113 to telephone system 101 is of course not the only possible protocol; for example, the protocol may begin with a message from network interface unit 113 instead of one from system 107. The minimum requirement is simply that at the end of the protocol, NIU 113 and switch 105(c) can communicate with each other and system 107 has related the current location of NIU 113 to NIU 113's telephone number.

The information in system data base 615 is now used for telephone number translation, maintenance, and billing. With telephone number translation, a data base 615 is used to translate all telephone numbers used in system 101 into network location information 627 needed to locate the NIUs 113 associated with the telephone numbers. Since network location information 627 is independent of the telephone number, there is no need for a permanent relationship in system 101 between a telephone number and a physical location. If a subscriber moves, he or she simply takes the NIU 113 to the new location. The NIU 113 and system 107 again interact as described above, and network location information 627 is updated to reflect the new location, but the telephone number remains the same. The same lack of permanent relationship between a telephone number and a physical location in network 101 makes it possible for the NIU 113 to be a mobile device.

System 107 does preventive maintenance by periodically sending a control packet to each NIU 113 which requests that the NIU 113 return its serial number and status information. One advantage of this technique is that system 107 always has available to it complete information on the configuration of system 101 down to the level of the network interface unit. Of course, if a portion of system 101 is damaged, system 107 can use more intensive polling to determine the extent of the damage. Further, as described above with regard to network interface unit 113, on discovering a defective network interface unit 113, system 106 can perform diagnostic and even restorative operations on the defective network interface unit 113.

Continuing with billing, subscriber information 623 may include a credit card number for the subscriber and will include current billing information. In a preferred embodiment, subscribers are charged a flat monthly access fee and a flat per-minute usage rate. There is thus no need for telephone system 101 to provide the subscriber with an itemized bill. All that billing code 605 need do is keep track of the number of minutes that a subscriber has used the network in the last month, use the total and the access fee to determine the amount of the bill, and send the amount to credit card data base 613 for the credit card specified by the subscriber. The subscriber's telephone bill appears as a single line in the subscriber's monthly credit card bill, thus making it unnecessary for telephone system 101 to itself either send bills to its subscribers or handle bill payments.

Figure 7:
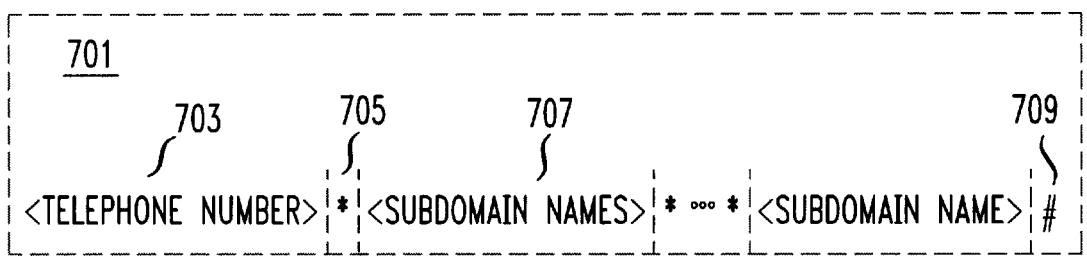
FIG. 7 is a diagram showing domain naming in telephone system 101.

Domain Naming in System 101: FIG. 7

In standard telephone systems, the entire telephone number is assigned by the telephone service provider. In the Internet packet network, logical addresses are made up of a hierarchy of domain names. For example, the Internet address of the inventor of the present patent application is agf@research. att. com. The top levels of the hierarchy are att.com, the domain name for AT&T Corp.; the next lower level is research; and agf identifies a user in the research domain. The Internet only assigns the domain names at the top level of the hierarchy, here att. com; the domain names at the lower levels and the user names are assigned by the parties to whom the next higher level belongs. Thus, AT&T Corp. has assigned the domain name research for use by members of its research laboratories, and the managers of the Internet for the research domain have assigned the inventor the user name agf.

In telephone system 101, the telephone number is a domain name which is assigned by the system. A user of a network interface unit 113 may assign his or her own subdomain names for devices connected to network interface unit 113 via home telephone line 439 or LAN 429 in the same fashion as is done in the Internet. Names in telephone system 101 have the form shown in FIG. 7. Name 701 begins with a telephone number 703, and may then have one or more subdomain names 707. Each subdomain name is preceded by a * symbol and the entire name is terminated by a # symbol. Both of these symbols are of course available on a standard telephone dialing pad. If telephone system 101 receives only telephone number 703, without any further symbols, it simply sets up virtual circuits as described above with network interface unit 113; if telephone system 101 receives a telephone number with subdomain names, it provides the subdomain names to network interface unit 113 in the call set up packet. Network interface unit 113 then uses the subdomain names to route packets received on the virtual circuit set up by the call set up packet to the device specified by the subdomain names.

For example, the user might have a fax machine connected to network interface unit 113 as well as a telephone. When the user connects the fax machine, interface unit 113 assigns a domain name, for example, F, to it. Someone who wishes to send a fax to that fax machine simply dials <telephone number>*F#, and network interface unit 113 responds by routing the packets on that virtual circuit to the fax machine. In some cases, the domain name may be predetermined; in others, a user may interact with interface unit 113 to assign a domain name. Of course, the use of virtual circuits in telephone system 101 makes it possible for network interface unit 113 to simultaneously handle a virtual circuit connected to the fax machine and a virtual circuit connected to the telephone, as well as virtual circuits connected to other devices.

Conclusion

The foregoing Detailed Description has disclosed to those skilled in the art how to make and use a new kind of telephone system which appears to the user to behave in the same manner as a prior telephone system but which may be built, provisioned, run, and maintained at a substantially lower cost than prior telephone systems and which is able to handle voice and data transmission with the same efficiency. One feature of the telephone system which provides these advantages is a virtual circuit packet network over which telephone calls move as short packets carrying compressed representations of voice signals. Because of the compressed representation, the telephone system requires substantially less bandwidth for a call than a standard telephone system, and the use of short packets, virtual circuits, and echo cancellation solves the delay problems typical of packet telephone systems. The packet network can also carry control packets, and there is thus no need for a separate signaling network.

Another feature is the use of intelligent network interface units at the edges of the network to provide interfaces between standard telephone equipment and the telephone system. The network interface units produce and consume packets from the network, do voice signal compression and decompression, and encryption and decryption, translate control packets into signals for standard telephone equipment and vice-versa, and also implement features such as call waiting or call forwarding. Additionally, the network interface units may interface between the telephone system and a local area network to which equipment such as computers or audio-visual devices are connected. The transmission medium, which connects the network interface units to the packet network, may be multiplexed among a large number of the network interface units. This fact, plus the use of network interface units to implement features, greatly reduces the complexity of the switches used in the packet network.

The telephone system also has a number of features that reduce the cost of provisioning and maintaining the network, simplify billing, and permit portability of telephone numbers and network interface units. The network interface units and all of the other devices in the network have enough intelligence to respond to polling packets from the network by identifying themselves to the network and to execute diagnostic and corrective code. The telephone system is consequently to a large extent self-provisioning and self-diagnosing, and the telephone system is therefore always able to determine its own configuration and condition. A single subscriber directory data base in the telephone system relates telephone numbers to network location information of network interface units. Only the location information has locational significance, and consequently, a subscriber may move his network interface unit and retain his telephone number. Billing is done using a flat access charge and a flat per-minute rate, and the telephone bill becomes a single line in he subscriber's monthly credit card bill.

The Detailed Description has set forth the best mode presently known to the inventor of making and using the telephone system; however, it will be immediately apparent to those skilled in the arts pertaining to the telephone system that telephone systems which embody the principles of the telephone system disclosed herein may be implemented in many different fashions. For example, the telephone system disclosed herein employs an ATM network for its packet network; however, a telephone system built according to the principles of the telephone system disclosed herein may employ any packet network for which the sum of the encoding and decoding delays and the packet network's bounded delay is small enough for reasonable telephone service. Similarly, while the network interface unit in a preferred embodiment is separate from the telephones connected to it, the network interface unit could be built into a telephone. Additionally, some or all of the functionality of the network interface unit could be provided by a switch to which telephones were connected by ordinary telephone lines. There are further many ways of implementing voice compression and decompression, self-provisioning, maintenance, address translation, and billing systems according to the principles disclosed herein.

The above being the case, the detailed description is intended to be merely illustrative and exemplary, but not restrictive, and the scope of the invention is to be determined solely from the attached claims as interpreted with the full breadth permitted by the patent laws.

I claim:

1. A telephone system comprising:
a wide-area packet network comprising nodes that route network packets over links that interconnect said nodes; and
a plurality of network interface units, connected to some of said nodes, each constructed to
 a) receive voice signals and encode said voice signals into network packets that are characterized as voice packets, with the encoding including compression of said voice signals,
 b) receive control signals and encode said control signals into network packets that are characterized as control packets,
 c) receive non-network packets and map said non-network packets onto network packets that are characterized as data packets,
 d) convert receives voice packets into voice signals,
 e) convert control packets into control signals, and
 f) convert data packets into said non-network packets.

2. A telephone system comprising:
a wide-area packet network comprising nodes that route network packets over links that interconnect said nodes; and
a plurality of network interface units, connected to some of said nodes, each including a
 a) a first port for connecting the network interface unit to said wide-area packet network,
 b) one or more telephony ports for connecting one or more telephony devices to said network interface unit via said telephony ports,
 c) a processor,
 d) a memory connected to said processor,
 e) a programming module that provides a dial tone to any one of said telephony ports that is detected to switch from an on-hook condition to said off-hook condition, and detects dual-tone multi-frequency signals arriving at said any one of said telephony ports, and
 f) a programming module to receive, from said first port, programming modules and to store received programming modules in said memory.

3. The system of claim 2 further comprising a programming module resident in said memory that implements a call forwarding feature for said first port.

4. The system of claim 2 further comprising a programming module resident in said memory that implements an 800 service feature for said first port.

5. The system of claim 2 further comprising a programming module resident in said memory that implements a call-waiting feature for said first port.

6. A telephone system comprising:
a wide-area packet network comprising nodes that route network packets over links that interconnect said nodes;
a plurality of network interface units, connected to a cable and interacting with said cable on a time-share basis, each of said network interface units constructed to
 a) receive voice signals and encode said voice signals into network packets that are characterized as voice packets, with the encoding including compression of said voice signals,
 b) receive control signals and encode said control signals into network packets that are characterized as control packets,
 c) receive non-network packets and map said non-network packets onto network packets that are characterized as data packets,
 d) convert receives voice packets into voice signals,
 e) convert control packets into control signals,
 f) convert data packets into said non-network packets; and
a cable, connected to one of said network interface units, adapted to support communication between a plurality of devices and said one of said network interface units on a time-share basis.

7. The system of claim 6 where information received by said one of said network interface units from said cable is in non-network packets.

8. A telephone system comprising:
a wide-area packet network comprising nodes that route network packets over links that interconnect said nodes; and
a plurality of network interface units, connected to some of said nodes, each network interface unit A of said plurality of network interface units including a
 a) a network port for connecting said network interface unit A to said wide-area packet network,
 b) one or more telephony ports for connecting one or more telephony devices to said network interface unit A via said telephony ports,
 c) a processor,
 d) a read/write memory connected to said processor,
 e) a programming module that provides a dial tone to any one of said telephony ports that is detected to switch from an on-hook condition to said off-hook condition, and detects dual-tone multi-frequency signals arriving at said any one of said telephony ports,
 f) a serial number installed in a permanent memory coupled to said processor, which serial number is a different serial number from serial number of all other network interface units, and associated with a customer who is financially responsible for use of said network interface unit A in said telephone network, and
 g) network ID installed in said read/write memory that is used by other network interface units when those other network interface units wish to communicate with said network interface unit A that contains said network ID in its read/write memory.

9. The system of claim 8 further comprising a provisioning module, coupled to a node of said wide-area packet network, and each of said network interface units includes a programming module, executed by said processor, that sends an equipment-identification packet to said provisioning module that includes a predetermined one from a set including said serial number, said network ID, and both said serial number and said network ID.

10. The system of claim 9, where said programming module sends said equipment-identification packet pursuant to a predetermined triggering event.

11. The system of claim 9 where said programming module sends said equipment-identification packet pursuant to any one of a set predetermined triggering events.

12. The system of claim 10 where said triggering event is connection of said network interface unit to said wide-area packet network.

13. The system of claim 10 where said triggering event is a receipt of a polling packet from said provisioning module.

14. The system of claim 13 where said provisioning module includes a programming module that, with a preselected frequency, broadcasts said polling packet.

15. The system of claim 9 where said network interface unit includes a programming module that responds to a received packet that seeks status information by performing diagnostic tests on said network interface unit and sending out to said wide-area packet network results of said tests.

16. The system of claim 9 where each node of said wide-area packet network includes a network ID.

17. The system of claim 16 where said equipment-identification packet that arrives at said provisioning module from a given network interface unit includes the network ID of a node of said wide-area packet network to which said given network interface unit is connected.

18. The system of claim 17 where said provisioning module includes a database for converting a provided network ID of a network interface unit to a network ID of a node to which said network interface unit is connected.

19. The system of claim 9 further comprising a network provisioning module, coupled to a node of said wide-area packet network, that communicates with nodes of said wide area network to impart routing information to said nodes.

20. The system of claim 19 where said network provisioning module is embedded within said provisioning module.

21. The system of claim 8 where said one or more telephony ports have an associated sub-domain identifier stored in said read/write memory, and a string that is employed by said wide-area packet network to establish a virtual path to one of said telephony ports that has an associated sub-domain identifier includes said sub-domain identifier.

22. The system of claim 8 where all but one of said one or more telephony ports have an associated sub-domain identifier stored in said read/write memory.

23. The system of claim 8 where said wide-area packet network, in response to a request to establish a first virtual path to a telephony port of a given network interface unit having a first sub-domain name, and a request to establish a second virtual path to a telephony port of said given network interface unit having a second sub-domain name, establishes and concurrently maintains both said first virtual path and said second virtual path.

24. The system of claim 9 where at least one of said network interface units further comprises a local area network connected to one of its telephony ports, said local area network being adapted to connect a plurality of customer devices, and said at least one of said network interface units including in its read/write memory a plurality of sub-domain names associated with said local area network.

25. The system of claim 24 where a string that is employed by said wide-area packet network to establish a virtual path to one of said customer devices includes a sub-domain identifier that is stored in said read/write memory.

* * * * *

UNITED STATES PATENT AND TRADEMARK OFFICE
CERTIFICATE OF CORRECTION

PATENT NO.    : 6,487,200 B1
DATED         : November 26, 2002
INVENTOR(S)   : Alexander Gibson Fraser It is certified that error appears in the above-identified patent and that said Letters Patent is hereby corrected as shown below:

Column 1,
Line 27, change "patcket" to -- packet -- and insert -- a -- before "packet".

Column 21,
Line 24, change "receives" to -- received --.
Line 34, delete "a".

Column 22,
Line 10, change "receives" to -- received --.
Line 27, delete "a".

Signed and Sealed this

Eleventh Day of March, 2003

JAMES E. ROGAN
*Director of the United States Patent and Trademark Office*